(12) United States Patent
Floyd

(10) Patent No.: US 6,343,949 B1
(45) Date of Patent: Feb. 5, 2002

(54) MODULAR JUMPER CABLE

(76) Inventor: Marvin Floyd, 41 Burnham Rd., Gorham, ME (US) 04038

( * ) Notice: Subject to any disclaimer, the term of this patent is extended or adjusted under 35 U.S.C. 154(b) by 0 days.

(21) Appl. No.: 09/612,336

(22) Filed: Jul. 6, 2000

(51) Int. Cl.[7] .............................................. H01R 11/00
(52) U.S. Cl. ...................................... 439/504; 439/284
(58) Field of Search ................................. 439/505, 504, 439/503, 502, 638, 668, 284

(56) References Cited

U.S. PATENT DOCUMENTS

| | | | |
|---|---|---|---|
| 4,272,142 A | | 6/1981 | Zapf |
| 4,336,975 A | * | 6/1982 | Casteel ........................ 439/502 |
| 4,885,524 A | * | 12/1989 | Wilburn ...................... 320/25 |
| 4,936,796 A | | 6/1990 | Anderson |
| 4,969,834 A | | 11/1990 | Johnson |
| 5,180,310 A | * | 1/1993 | Miller ......................... 439/503 |
| 5,230,637 A | | 7/1993 | Weber |
| 5,707,250 A | | 1/1998 | Smithson |
| 5,816,849 A | * | 10/1998 | Schmidt ..................... 439/505 |
| 5,971,799 A | | 10/1999 | Swade |

FOREIGN PATENT DOCUMENTS

GB          588027          5/1947

* cited by examiner

Primary Examiner—P. Austin Bradley
Assistant Examiner—Briggitte R. Hammond
(74) Attorney, Agent, or Firm—Pierce Atwood

(57) ABSTRACT

A modular jumper cable system for connecting two batteries together. The cable system includes two cable units, one for detachable connection to one battery, the other for detachable connection to the other battery. The cable units may be connected to the batteries' terminals by easy-to-operate connectors, such as conductive eyelets. The system further includes an intermediate cable connector for joining the two cable units together. The linking connection ends of the cable units and the intermediate connector are formed of releasable connection devices that must be oriented in only one way to complete a connection. The connection devices ensure that like terminals of the batteries will be connected to one another. Difficult-to-manipulate alligator clamps are avoided in the modular jumper cable system.

4 Claims, 3 Drawing Sheets

MODULAR JUMPER CABLE

BACKGROUND OF THE INVENTION

1. Field of the Invention

The present invention relates to battery-charging jumper cables. More particularly, the present invention relates to modular jumper cables. Still more particularly, the present invention relates to a jumper cable system including a first cable to connect to a first battery, a second cable to connect to a second battery, and an intermediate cable with quick disconnect for connecting the first and second cables together.

2. Description of the Prior Art

Battery jumper cables are used to establish a circuit between a charged battery and a discharged battery such that the charged battery can be used to start the discharged battery. The jumper cables generally available commercially include two insulated conductive cables each terminating at opposing ends with connectors, all as a unitary device. The connectors most commonly forming part of these devices are spring-loaded sawtooth clamps are identified as alligator clamps.

The jumper cables with alligator clamps provide an effective means to couple together two batteries each having a positive terminal and a negative terminal. To effect a coupling, the handle of a first one of the alligator clamps is squeezed to open the jaws of the clamp and create an opening larger than a battery terminal. The jaws are placed about the terminal and the handle released so that the teeth of the clamp are secured onto the terminal. This process is repeated for all four terminals when two batteries are connected together. When that coupling is completed, the charging process may be initiated.

Of course, it is important to ensure that the battery connection establishes a completed circuit. This is achieved by connecting one of the two cables of the jumper cable to either the positive or negative terminal of one of the batteries and then connecting the other end of that same cable to the corresponding terminal of the other battery. Failure to connect positive to positive and negative to negative will prevent charging and could create a hazardous condition.

Unfortunately, existing commercially available jumper cables of the type described above have several undesirable characteristics. First, the spring-loaded alligator clamps require the user to exert considerable effort to force open the jaws wide enough to accommodate the battery terminals. That effort must be repeated four times if the user is alone. For individuals having inadequate grip strength, the task may be impossible to complete. In that situation, the goal of charging a dead battery may not be achieved. Dependent upon the surrounding conditions, such as the time of day, the weather, and the proximity of the dead battery to well-lit and/or populated areas, the inability to charge a dead battery may be a frightening event. It is desirable to have a jumper cable system that may be easy to use regardless of the strength of the user.

Another concern related to the use of the present alligator-clamp-based jumper cables is the ability to ensure that like battery terminal will be coupled to like battery terminal. Again, dependent upon surrounding conditions, it can be difficult to observe all of the connections and make sure that the positive terminals are connected together and the negative terminals are connected together. It is desirable to have a jumper cable system that eliminates the possibility that incorrect connections will be made.

Yet another concern associated with the existing unitary jumper cables is the limitation on the length of the cables used. The two batteries must generally be placed in close proximity to one another to complete the connection. However, there are numerous situations where that may be difficult including, but not limited to, two vehicles that cannot be placed close to one another. It is therefore desirable to have a jumper cable system that is sufficiently flexible to allow the user to couple the batteries together when they are not immediately adjacent to one another.

Alternative jumper cable systems have been described in the prior art. U.S. Pat. No. 4,272,142 issued to Zapf describes a jumper cable system formed of two cables. Each cables is formed of a pair of wires, each set of wires having at one end the standard alligator clamps for connecting to respective batteries that are to be coupled to one another. The opposite end of each set of wires terminates in a coupling block having overlapping conductive plates. The Zapf device is apparently designed to allow for easy connection of two sets of jumper cables. However, it continues to include the difficult-to-operate alligator clamps.

U.S. Pat. No. 5,707,250 issued to Smithson describes a battery connector including two connectable cables. The first cable is coupled to one battery post terminal in the conventional way. It includes at the opposing end a quick disconnect male connector. The second cable has an eyelet connector to be placed on another battery terminal post. The opposing end of that second cable includes a quick disconnect female connector for connecting to the male connector of the first cable. It appears that you would need two sets of those cable pairs to ensure a complete connection for the purpose of charging one battery using another.

The prior systems fail to provide a safe and easy-to-use jumper system to ensure that battery charging can be effected. Therefore, what is needed is a jumper cable system that is operable with minimal physical effort. Further, what is needed is a jumper cable system that is configured to ensure that like terminal will be connected to like terminal. Still further, what is needed is a jumper cable system that may be employed when the batteries are not immediately adjacent to one another.

SUMMARY OF THE INVENTION

It is an object of the present invention to provide a jumper cable system that is operable with minimal physical effort. It is also an object of the present invention to provide a jumper cable system that is configured to ensure that like terminal will be connected to like terminal. Further, it is an object of the present invention to provide a jumper cable system that may be employed when the batteries are not immediately adjacent to one another. In particular, it is an object of the present invention to provide a modular battery jumper cable system.

These and other objects are achieved in the present invention through the use of a modular jumper cable system that includes easy-to-use connectors. The system includes three components. The first is an intermediate cable having an isolated pair of conductive wires or cords. Each of the two ends of the intermediate cable terminates in connector block having two separated ports, corresponding to the conductive wires. The other two components of the system are battery cables. Each of the battery cables includes an isolated pair of conductive wires or cords. At one end of each battery cable is a pair of battery-post loops, one for each conductive wire, to be easily applied to the positive and negative posts of a battery. The opposing end of each battery cable includes an interface connector having two separated ports, corresponding to the respective conductive wires. The interface connector is designed to be releasably and easily connected to one of the connector blocks of the intermediate cable. Preferably, the respective connectors can only be connected together one way such that when the intermediate and battery cables are connected together, like battery terminals are connected together.

These and other advantages of the present invention will become apparent upon review of the following description and the accompanying drawing.

DESCRIPTION OF THE INVENTION

Figure 1:
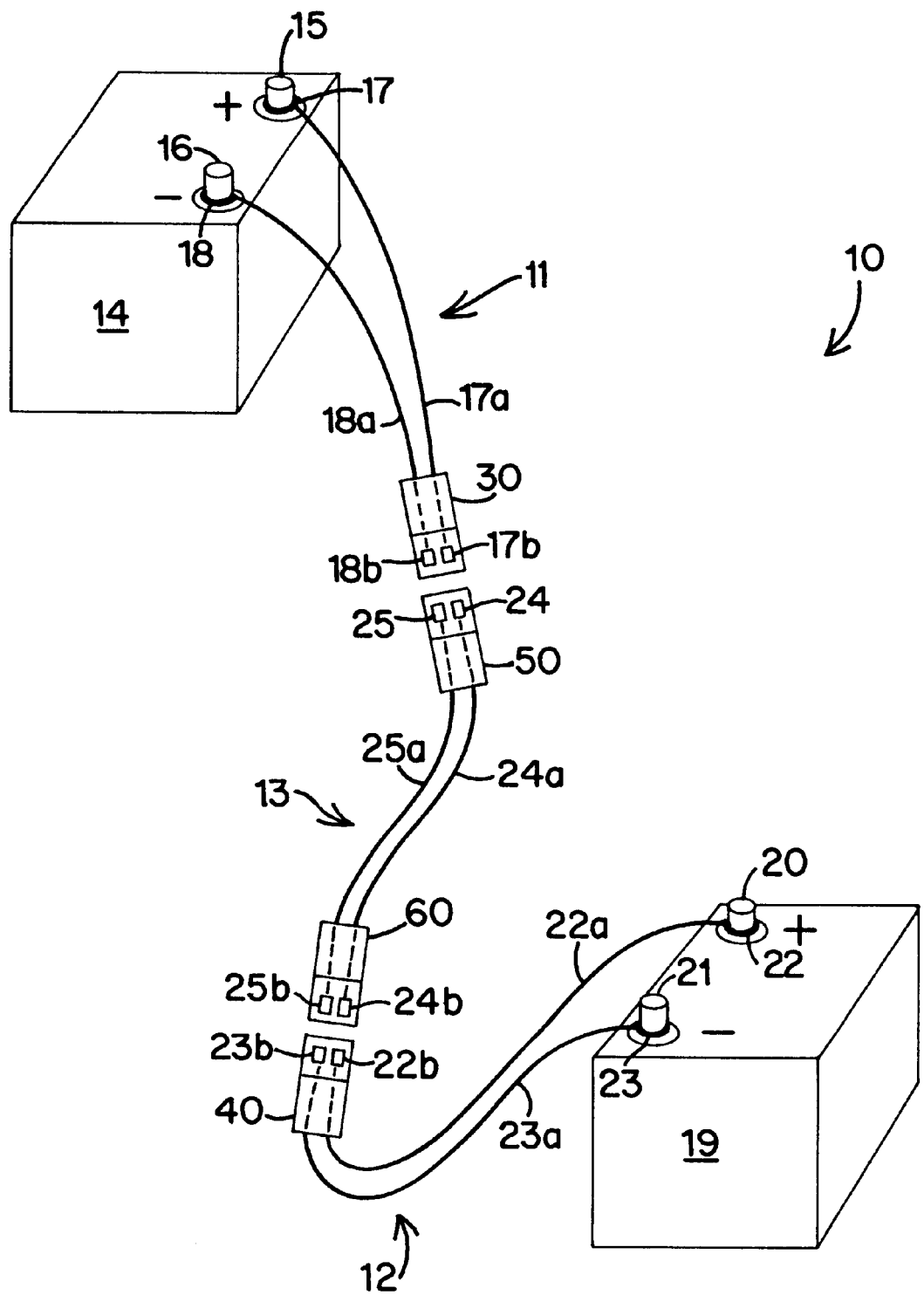
FIG. 1 is a perspective view of the modular jumper cable system of the present invention in the context of connecting two batteries.
Figure 3:
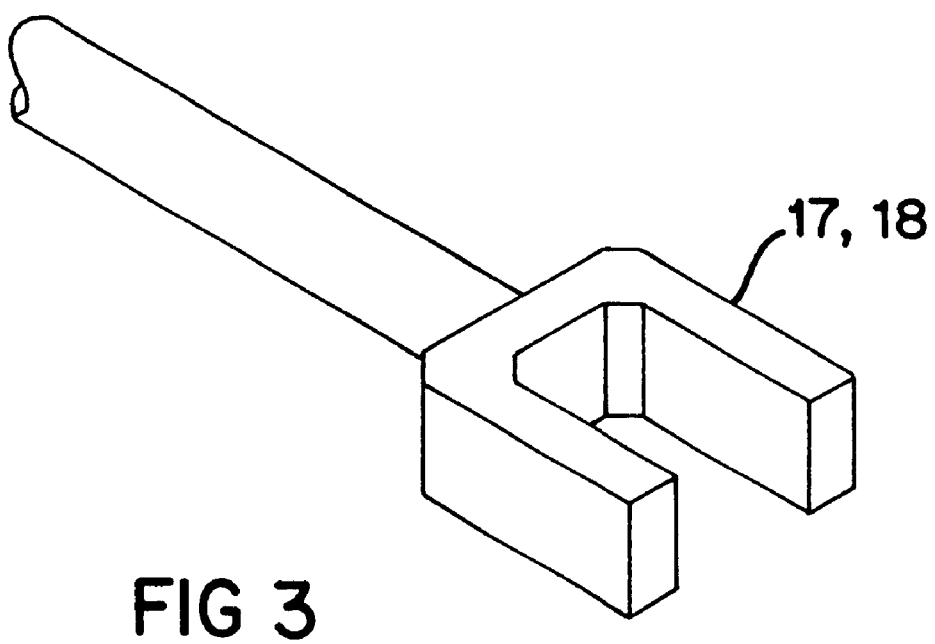
FIG. 3 is a perspective view of a horseshoe-shaped battery coupling device.
Figure 4:
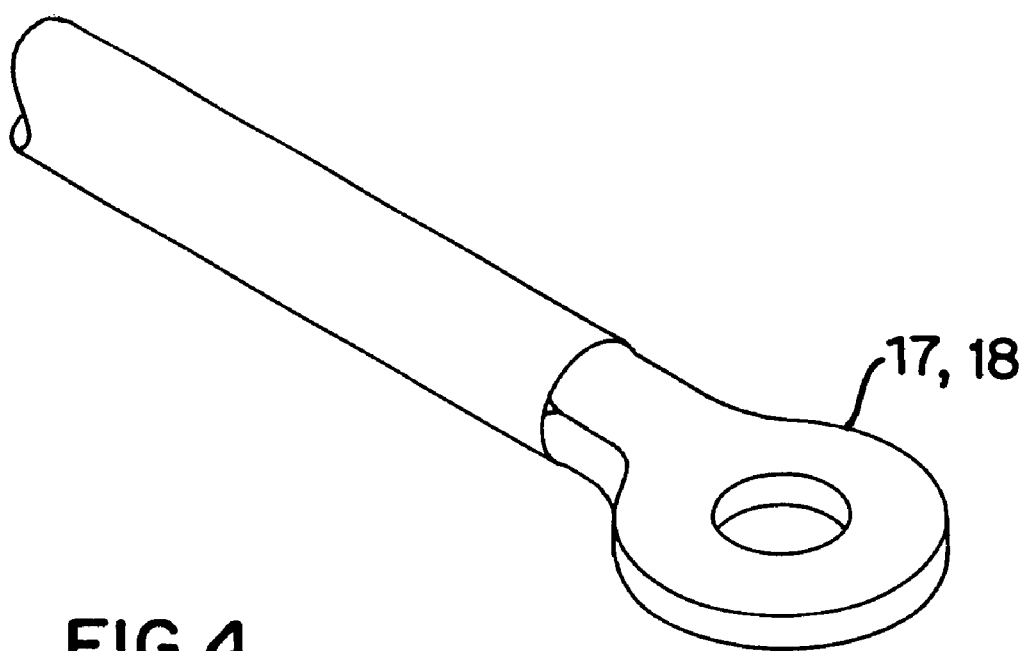
FIG. 4 is a perspective view of an eyelet-type battery coupling device.

A modular jumper cable system 10 of the present invention is shown in FIG. 1. The system 10 includes a first battery-connecting cable unit 11, a second battery-connecting cable unit 12, and an intermediate cable connector 13. The first cable unit 11 is connectable to a first battery 14 having a positive battery terminal 15 and a negative battery terminal 16. The first cable unit 11 is detachably connectable to the first battery 14 by way of a first battery-coupling device 17 and a second battery-coupling device 18. The first and second battery coupling devices 17,18 may be any type of easy-to-attach termination of a conductive cable, but are preferably formed of conductive material, such as a metal, in a shape including, but not limited to, an eyelet (FIG. 4) or a horseshoe (FIG. 3). A terminal cap may be applied to the terminals 15,16, in order to retain the devices 17,18, thereon, if desired.

Coupling device 17 is preferably permanently joined to a first conductor cable 17a, such as by welding, and the conductor cable 17a is preferably retained within an insulative non-conducting sleeve. Conductor cable 17a terminates within a first cable coupler 30 at a first cable conductor end 17b. Coupling device 18 is preferably permanently joined to a second conductor cable 18a, such as by welding, and the conductor cable 18a is preferably retained within an insulative non-conducting sleeve. Conductor cable 17a and conductor cable 18a may optionally be connected to one another, but only by way of their respective insulative sleeves and not by way of the conductive material therein. Of course, that conductive material must be substantial enough to support the transfer of charges of the type to be expected when charging one battery by way of another. Conductor cable 18a terminates within the first cable coupler 30 at a second cable conductor end 18b.

The second cable unit 12 is configured in substantially the same way as that of unit 11. Specifically, the second cable unit 12 is detachably connectable to a second battery 19 having a positive battery terminal 20 and a negative battery terminal 21. The second cable unit 12 is detachably connectable to the second battery 19 by way of a first battery-coupling device 22 and a second battery-coupling device 23.

The first and second battery coupling devices 22,23 may be any type of easy-to-attach termination of a conductive cable, but are preferably formed of conductive material, such as a metal, in a shape including, but not limited to, an eyelet or a horseshoe. A terminal cap may be applied to the terminals 20,21, in order to retain the devices 22,23, thereon, if desired.

Coupling device 22 is preferably permanently joined to a third conductor cable 22a, such as by welding, and the conductor cable 22a is preferably retained within an insulative non-conducting sleeve. Conductor cable 22a terminates within a second cable coupler 40 at a third cable conductor end 22b. Coupling device 23 is preferably permanently joined to a fourth conductor cable 23a, such as by welding, and the conductor cable 23a is preferably retained within an insulative non-conducting sleeve. Conductor cable 22a and conductor cable 23a may optionally be connected to one another, but only by way of their respective insulative sleeves and not by way of the conductive material therein. Of course, that conductive material must be substantial enough to support the transfer of charges of the type to be expected when charging one battery by way of another. Conductor cable 23a terminates within the second cable coupler 40 at a fourth cable conductor end 23b.

With continuing reference to FIG. 1, cable unit 11 and cable unit 12 are connected to each other, such that batteries 14 and 19 are connected to one another, through intermediate cable connector 13. Connector 13 includes a first intermediate coupler 50 for coupling connector 13 to unit 11, and a second intermediate coupler 60 for coupling connector 13 to unit 12. Connector 13 further includes a first conductive contact end 24 preferably permanently joined to a fifth conductor cable 24a, such as by welding. The conductor cable 24a is preferably retained within an insulative non-conducting sleeve. Conductor cable 24a terminates within the second intermediate coupler 60 at a second conductive contact end 24b. Connector 13 also includes a third conductive contact end 25 preferably permanently joined to a sixth conductor cable 25a, such as by welding. The conductor cable 25a is preferably retained within an insulative non-conducting sleeve. Conductor cable 24a and conductor cable 25a may optionally be connected to one another, but only by way of their respective insulative sleeves and not by way of the conductive material therein. Of course, that conductive material must be substantial enough to support the transfer of charges of the type to be expected when charging one battery by way of another. Conductor cable 25a terminates within the coupler 60 at a fourth conductive contact end 25b. It is to be noted that cables 17a, 18a, 22a, 23a, 24a, and 25a may be of any reasonable length desired and dependent upon the distance between batteries 14 and 19.

In order to establish a connection between the first battery 14 and the second battery 19, coupler 30 must be connected to coupler 50 and coupler 40 must be connected to coupler 60. It is important to ensure that like battery terminal is connected to like battery terminal to establish a charge-suitable connection. That is, the first cable unit 11, the second cable unit 12, and the intermediate connector 13 must be arranged and joined so that terminal 15 is connected to terminal 20 and terminal 16 is connected to terminal 21. This is achieved in the present invention using one-way locking couplers. In particular, each of couplers 30, 40, 50, and 60 is of similar type and designed such that they can be connected to one another in only one orientation. It is preferable that they not be conventional male-to-female connectors that permit a user to maintain one coupler in one position and allow a coupling to occur whether the other coupler is in one orientation or rotated 180° from that orientation. If that were permitted, in the coupler 30 to coupler 50 relationship, for example, cables 17a and 18a could be twisted around, the connection completed, and the outcome would be a coupling of terminal 15 to terminal 21 and terminal 16 to terminal 20.

Figure 2:
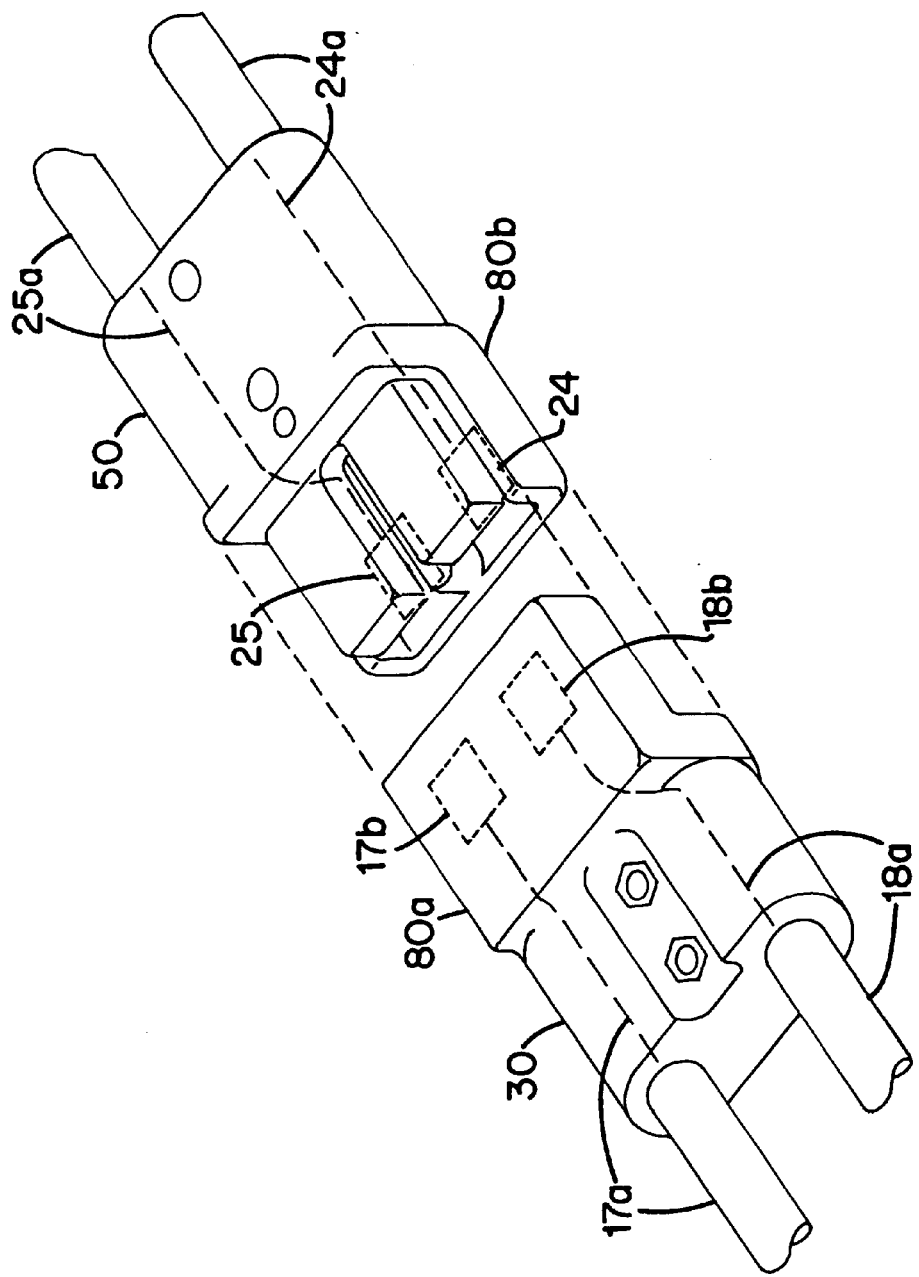
FIG. 2 is a side view of the connector interface of the first cable unit to the intermediate cable connector of the present invention.

In order to avoid this undesirable outcome, each of couplers 30, 40, 50, and 60 is preferably an ASMH connector such as that identified as model 6A070 in the W. W. Grainger 1999 Contractor catalog at page 2318"A". That connector may be modified to be joined to the respective cables identified in FIG. 1. A simplified illustration of the suitable coupler design is shown in FIG. 2. In that figure, coupler 30 of cable unit 11 is shown poised for connection to coupler 50 of intermediate connector 13. It can be seen that the only way that the two couplers may be connected together occurs when, and only when, the two are oriented in one way with respect to one another. If one of the two couplers were left in position and the other rotated 180°, overlapping sections 80a and 80b would not fit together. Couplers 40 and 60 are similarly established. While the invention has been described with reference to a particular example embodiment, it is intended to cover all modifications and equivalents as described in the following claims.

What is claimed is:

1. A modular cable system for connecting a first battery having a first terminal and a second terminal to a second battery having a first terminal and a second terminal, the modular cable system comprising:

a. a first cable unit including a first cable and a second cable, the first cable having a first terminal connection end for detachable connection to the first terminal of the first battery, and a second conductor end, and the second cable having a first terminal connection end for detachable connection to the second terminal of the first battery, and a second conductor end, wherein said second conductor end of said first cable and said second conductor end of said second cable are housed in a first coupler housing;

b. a second cable unit including a third cable and a fourth cable, the third cable having a first terminal connection end for detachable connection to the first terminal of the second battery, and a second conductor end, and the fourth cable having a first terminal connection end for detachable connection to the second terminal of the second battery, and a second conductor end, wherein said second conductor end of said third cable and said second conductor end of said fourth cable are housed in a second coupler housing; and c. an intermediate cable connector including a fifth cable and a sixth cable, the fifth cable having a first conductor end and an opposing second conductor end, and the sixth cable having a first conductor end and a second conductor end, wherein said first conductor ends of said fifth and sixth cables are housed in a third coupler housing, wherein said second conductor ends of said fifth and sixth cables are housed in a fourth coupler housing, and wherein said first coupler housing, said second coupler housing, said third coupler housing, and said fourth coupler housing are structurally identical and are releasably connectable to one another.

2. The modular cable system as claimed in claim 1 wherein said terminal connection ends of said first cable, said second cable, said third cable, and said fourth cable are conductive eyelets.

3. The modular cable system as claimed in claim 1 wherein said terminal connection ends of said first cable, said second cable, said third cable, and said fourth cable are conductive horseshoe-shaped terminals.

4. The modular cable system as claimed in claim 1 wherein each one of said first coupler housing, said second coupler housing, said third coupler housing, and said fourth coupler housing can be connected to another one of said coupler housings in only one orientation.

* * * * *